(12) United States Patent
Peterson et al.

(10) Patent No.: US 6,425,696 B1
(45) Date of Patent: Jul. 30, 2002

(54) MOLDED FIBER OPTIC FERRULE RECEPTABLE

(75) Inventors: Bruce A. Peterson, Schaumburg;
Theodore E. Washburn, Barrington;
Scott Erickson, Bartlett; Mark C.
Benton, Barrington, all of IL (US)

(73) Assignee: Stratos Lightwave, Chicago, IL (US)

( * ) Notice: Subject to any disclaimer, the term of this patent is extended or adjusted under 35 U.S.C. 154(b) by 93 days.

(21) Appl. No.: 09/606,131

(22) Filed: Jun. 28, 2000

(51) Int. Cl.[7] .............................. G02B 6/42; G02B 6/36
(52) U.S. Cl. ........................................... 385/92; 385/88
(58) Field of Search ..................................... 385/88–94

(56) References Cited

U.S. PATENT DOCUMENTS

| | | | |
|---|---|---|---|
| 4,461,537 A | * | 7/1984 | Raymer, II et al. ......... 350/96.2 |
| 5,537,507 A | | 7/1996 | Cina et al. ..................... 385/93 |
| 5,661,834 A | | 8/1997 | Watanabe et al. ............. 385/92 |
| 6,059,463 A | * | 5/2000 | Althaus et al. ................ 385/92 |
| 6,061,493 A | | 5/2000 | Gilliland et al. ............. 385/140 |

* cited by examiner

Primary Examiner—John D. Lee
Assistant Examiner—Jerry T Rahll
(74) Attorney, Agent, or Firm—Steven M. Evans

(57) ABSTRACT

A fiber optic ferrule receptacle with a single-molded housing having a base, a cylinder on a first side of the base having a bore for receiving an optic ferrule, a socket on a second side of the base, opposing the first side, for receiving an optical element; and the bore having a first diameter at an outer opening distal to the base, and a second diameter at an inner opening adjacent to the base, wherein the first diameter is greater than the second diameter. A second embodiment comprises a single-molded housing having a base, a cylinder on a first side of the base having a bore for receiving an optic ferrule, a socket on a second side of the base, opposing the first side, for receiving an optical element; and a plurality of sloping ridges located on the inner wall of the cylinder, wherein widths of the sloping ridges increase closer to the base.

14 Claims, 6 Drawing Sheets

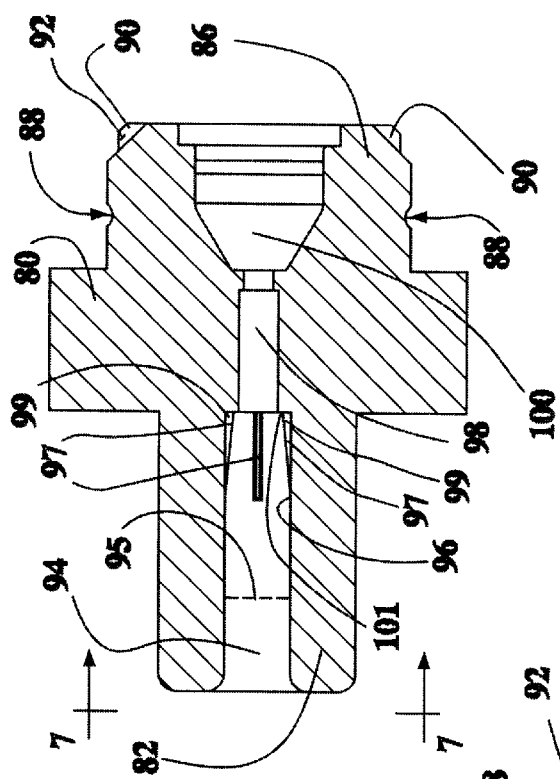
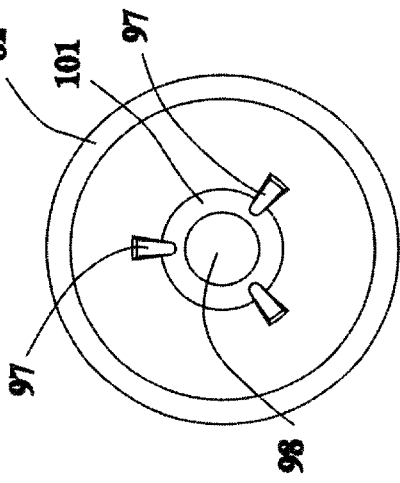
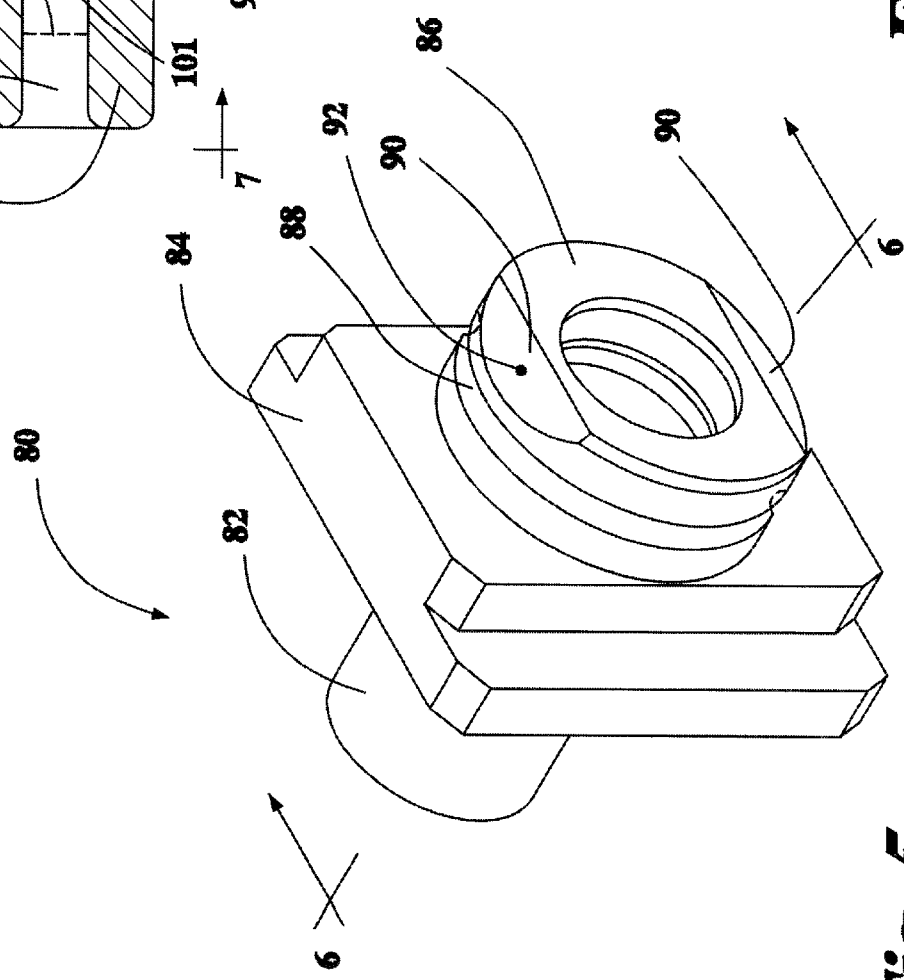
Fig. 6
Fig. 7
Fig. 5

MOLDED FIBER OPTIC FERRULE RECEPTABLE

FIELD OF THE INVENTION

The present invention relates generally to receptacles for fiber optic ferrules, and more particularly, the present invention provides a receptacle having improved alignment and mounting capabilities for a fiber optic ferrule.

BACKGROUND OF THE INVENTION

Referring to FIG. 1, illustrated is a sectional view of an optical module 10 configured in accordance with the prior art. The optical module 10 includes a housing 12 having a cylindrical sleeve 11 with a bore 14. The housing 12 is constructed of metallic material that can be welded or bonded to a semiconductor element 16. The semiconductor element 16 has an annular flange 18 and electrical leads 20 extending from a base 22. The semiconductor element 16 is mounted within a socket 24 of the optical module 10. The semiconductor element 16 is positioned against the inner walls 26 of the socket by spacers 28. The semiconductor element 16 is secured within the socket 24 by welding or using an adhesive.

The semiconductor element 16 shown in the illustrated embodiment includes a light emitting diode (LED) 30. In other embodiments the LED 30 can be replaced by a semiconductor laser as a light source. Light waves emitted from the LED 30 are communicated via an optical fiber 32. An optical ferrule 34 houses and mounts the optical fiber 32 within the bore 14. An optical fiber terminal 36 positions and mounts the optical fiber cable 38 within the optical ferrule 34.

The diameter of the bore 14 within the cylindrical sleeve 11 is constant. The optical ferrule 34 is inserted and held within the bore 14 resulting in a tight fit within the bore 14. As a result of the tight fit between the optical ferrule 34 and the bore 14, misalignment or physical damage to the optical ferrule 34 and/or the bore 14 sometimes results.

Semiconductor optical transmitters typically have the design as illustrated in FIG. 1. Performance of an optical semiconductor transmitter is affected by improper alignment of the transmitter lens or LED 30 with then input end 31 of the optical fiber 32. Proper alignment maximizes the amount of light from the LED 30 to be focused on the input end 31 of the optical fiber 32. Conventional techniques for improving this alignment include minimizing the space or gap between the optical ferrule 34 and the bore 14 when the optical ferrule 34 is inserted into the bore 14.

A single-mode optical fiber has a diameter of approximately 10 microns, and the diameter of the bore 14 should match the ferrule 34 diameter on the order of less than several microns in terms of both the tolerance of diameter and circularity. Numerous steps are used in the fabrication process in order to achieve such a high degree of accuracy. Since a conventional housing 12 is made out of metal, very refined mechanical processing is required to fabricate the housing 14. Moreover, since the diameter of the optical ferrule 34 is typically 2.5 mm, surface roughness must be minimized in order reduce friction and allow insertion or removal of the optical ferrule into or out of the bore in the sleeve.

Accordingly, there is a need for an optical ferrule receptacle providing improved alignment of an optical ferrule, which can be produced at an attractive cost.

OBJECTS AND SUMMARY OF THE INVENTION

An object of the present invention is to provide a receptacle for an optical ferrule having improved alignment capability.

Another object of the present invention is to provide an optical ferrule receptacle that can be produced at a reduced cost.

A further object of the invention is to provide an optical ferrule receptacle constructed out of a single-molded material, such plastic or other polymer.

An additional object of the invention is provide an optical ferrule receptacle having improved socket mounting capabilities for receiving an optical transmitting source.

Another object of the invention is to provide an optical ferrule receptacle having improved capabilities for mounting optical ferrules by minimizing damage to the optical ferrule and optical fibers during the insertion process.

A further object of the invention is to provide an optical ferrule receptacle having increased assembly speed by facilitating the insertion and securing of the optical ferrule within a an optical bore of the optical ferrule receptacle.

Moreover, an object of the present invention is to provide a notch in the housing for a gate where molding material is injected, thereby eliminating the need to remove surrounding excess molding material. The gates are also located in the rear of the receptacle to allow axial flow of molding material during injection molding, thereby producing a symmetric flow around core pins which increases the accuracy of ferrule bore dimensions.

According to the present invention, a fiber optic ferrule receptacle is provided having a single-molded housing having a base, a cylinder on a first side of the base having a bore for receiving an optical ferrule, a socket on a second side of the base opposite the first side, for receiving a ball lens, and the bore having a first diameter at an outer opening distal to the base, and a second diameter at an inner opening adjacent to the base, wherein the first diameter is greater than the second diameter. In a second embodiment of the present invention, a single-molded housing is provided having a base, a cylinder on a first side of the base having a bore for receiving an optic ferrule, a socket on a second side of the base, opposing the first side, for receiving an optical element; and a plurality of sloping ridges located on the inner wall of the cylinder, wherein widths of the sloping ridges increase closer to the base.

BRIEF DESCRIPTION OF THE DRAWINGS

FIG. 5 is a perspective view of an optical ferrule receptacle configured in accordance with a second embodiment of the present invention;

FIG. 6 is a cross-sectional view of the optical ferrule receptacle shown in and taken along line 6—6 of FIG. 5;

FIG. 7 is an end view of the optical ferrule receptacle shown in and taken along line 7—7 of FIG. 6.

DETAILED DESCRIPTION OF THE PREFERRED EMBODIMENTS

Figure 2:
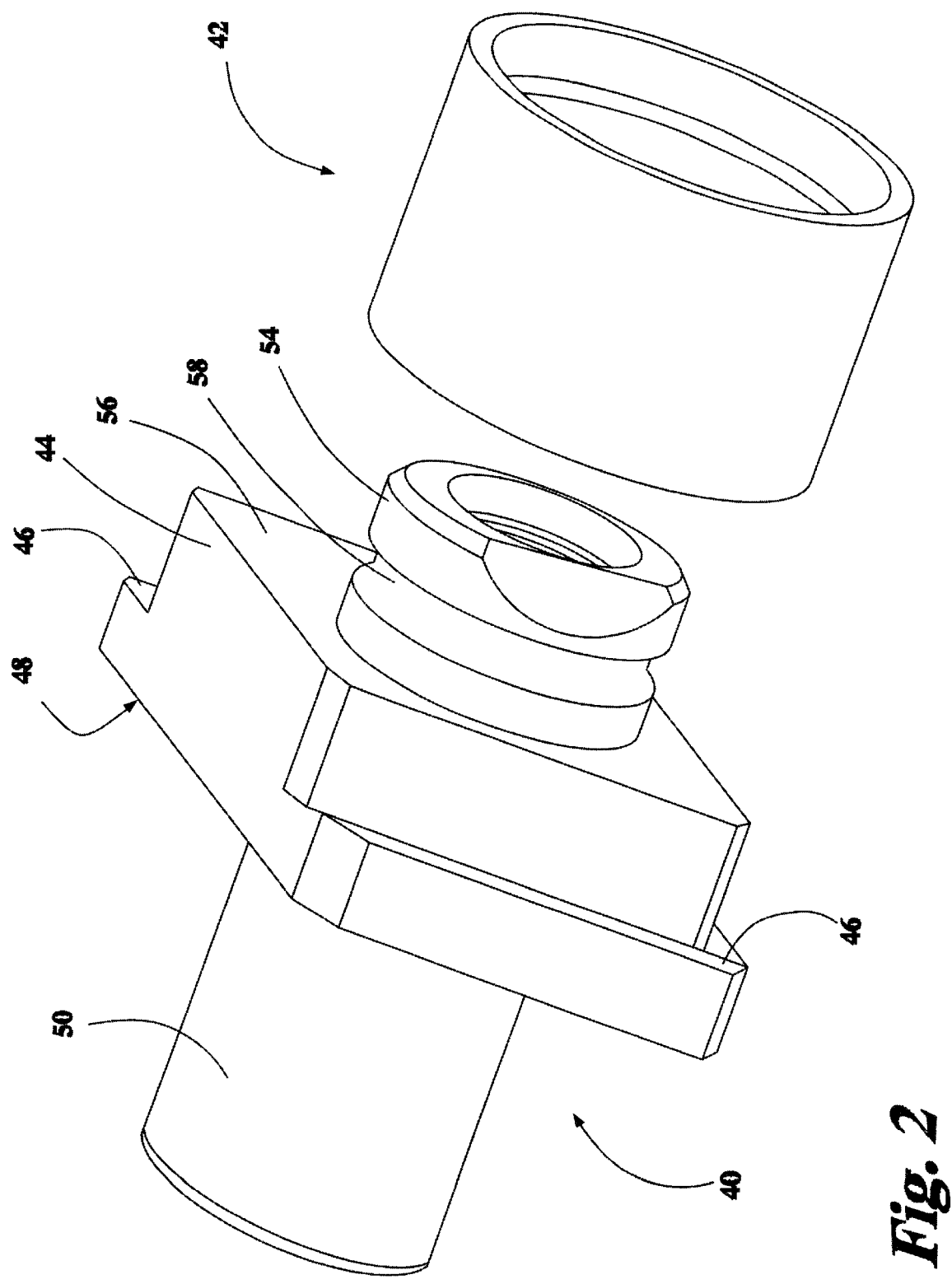
FIG. 2 is a perspective view of an optical ferrule receptacle and an adjoining cylinder configured in accordance with the present invention.

Referring now to FIG. 2, illustrated are an optical ferrule receptacle 40 and an adjoining cylinder 42 configured in accordance with the present invention. The optical ferrule receptacle 40 includes a base 44 having a pair of flanges 46. In a preferred embodiment, the flanges 46 are sloped downward toward the bottom 48 of the base 44. In other embodiments the flanges 46 may be parallel to the bottom 48 or at different angles. A ferrule sleeve 50 is attached to the bottom 48 of the base 44. The ferrule sleeve 50 includes a bore 52 (FIG. 3) for receiving an optical ferrule.

A socket 54 is attached to the top 56 of the base 44. The socket 54 is configured for receiving an optical element (not shown), such as a ball lens. The outer periphery of the socket 54 includes an annular groove 58. The annular groove 58 is sized to fit within an annular ring 60 (FIG. 3) inside the cylinder 42. The annular groove 58 fits into the annular ring 60 to correctly position and affix the socket 54 inside cylinder 42.

Figure 3:
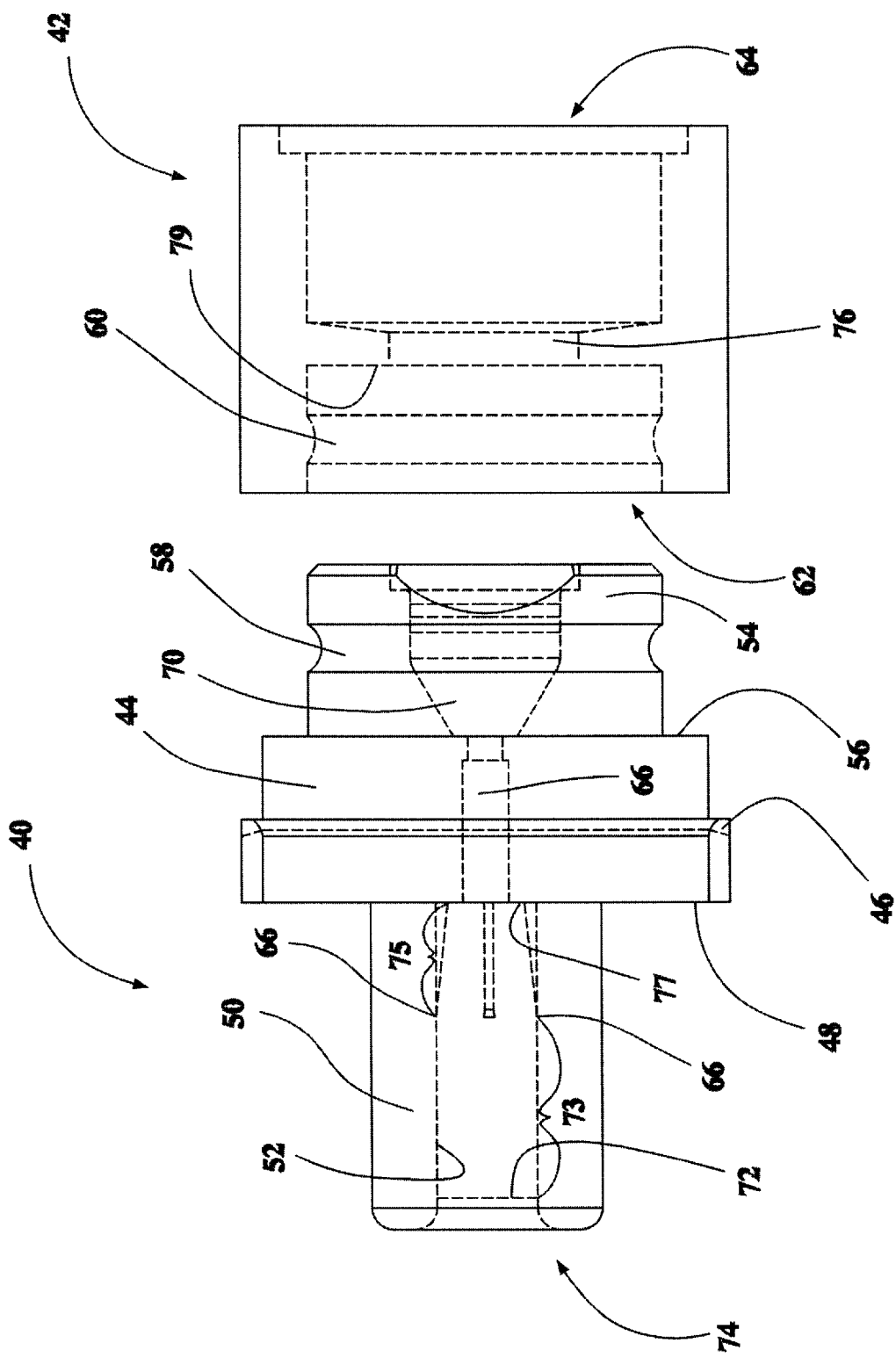
FIG. 3 is a side view of the optical ferrule receptacle and cylinder shown in FIG. 2, wherein the internal configurations are shown in shadow.

FIG. 3 shows a side view of the optical ferrule receptacle 40 and the cylinder 42 shown in FIG. 2. The internal configurations of the optical ferrule receptacle 40 and the cylinder 42 are shown in shadow. The ferrule sleeve 50, ferrule bore 52, base 44, and socket 54 are also shown. The cylinder 42 is shown having a socket 52 (in shadow) with an annular ring 60. The cylinder 42 further includes a socket 64 for receiving a semiconductor module, such as the semiconductor module 16 shown in FIG. 1 having an LED 30 as a light source. It should be noted that a semiconductor laser can be used in place of the LED as the light source, or another light emitting device may be used. In addition to use for a TOSA, the present invention may be applicable for a ROSA assembly also and house a photo detector.

In accordance with the present invention, the optical ferrule receptacle 40 is single-molded unit made from a polymer, such as a plastic. Furthermore, the ferrule bore is tapered for one-third the length proximate to the bottom of the base in order to easily, accurately, centrally and securely insert an optical ferrule within the ferrule bore. Moreover, a socket for the lens includes an annular groove on the outer periphery of the socket which is sized to fit within an annular ring of a connecting cylinder to accurately and securely position the socket within the cylinder.

The ferrule bore 52 maintains a constant diameter until a transition point 66. At the transition point 66, which is about one-third of the total length of the sleeve 50 from the bottom 48 of the base 44, the diameter of the ferrule bore 52 decreases, preferably, at a linear rate. An aperture 66, provides a tunnel or pathway connecting the bore 52 with the chamber 70 of the socket 54. The diameter of the aperture 66 is smaller than the final third portion 75, thus creating a stop plate 77 against the bottom 48 of the base 44. Light waves from a light source within the chamber 70, such as a semiconductor laser or an LED, pass through the aperture 66 and onto a receiving end of an optical fiber mounted within the ferrule bore 52. The light waves can be focused through the aperture 66 onto an optical fiber by using an optical element, such as a ball lens, located within the chamber 70 of the socket 54.

Since the optical ferrule receptacle 40 is constructed of a polymer, such as plastic, the ferrule sleeve 50 can expand or stretch slightly as an optical ferrule enters the bore 52 and comes in contact with the transition point 66 of the bore 52. The diameter 72 of the bore 52 at the opening 74 of the sleeve 50 is constant and sized to match, or be only slightly greater, than the diameter of a ferrule being inserted into the bore 52. The portion 73 of the bore 52 having a constant diameter is preferably two-thirds the overall length of the bore 52. The portion 73 of the bore 52 functions to accurately position an optical fiber of a ferrule within the bore 52.

At the transition point 66 the diameter of the bore 52 begins to decrease at the final one-third portion 75 of the bore 52. The decreasing diameter of portion 75 of the bore 52 functions to accurately position an optical fiber within the bore 52. The decreasing portion 75 also functions to securely mount a ferrule within the bore 52 of the sleeve 50. The constant diameter 72 of the first portion 73 enables the ferrule to be easily inserted by hand with a zero or low insertion force. The second portion 75 enables the ferrule to be accurately inserted by hand with a low or greater insertion force, resulting in the ferrule being held in place by friction after insertion.

The cylinder 42 includes a first socket 62 sized to cover and enclose the socket 54 of the optical ferrule receptacle 40. The cylinder 42 is preferably constructed of metal and is a single unit. The socket 62 of the cylinder or ring 42 includes an annular ring 62 formed out of the inner wall of the socket 62. The annular ring 60 is sized to fit into the annular groove 58 of the socket 54. Since the annular ring 60 is formed out of the inner wall of the cylinder 42, and thus out of metal, the annular ring 60 will not wear down during a single or multiple couplings with the plastic annular groove 58 of the socket 54, which is formed from plastic. The socket 62 and annular groove 60 and socket 62 are sized to closely fit around the socket 54, thus ensuring an accurate positioning and secure fastening during coupling of the receptacle 40 and the cylinder 42.

Figure 1:
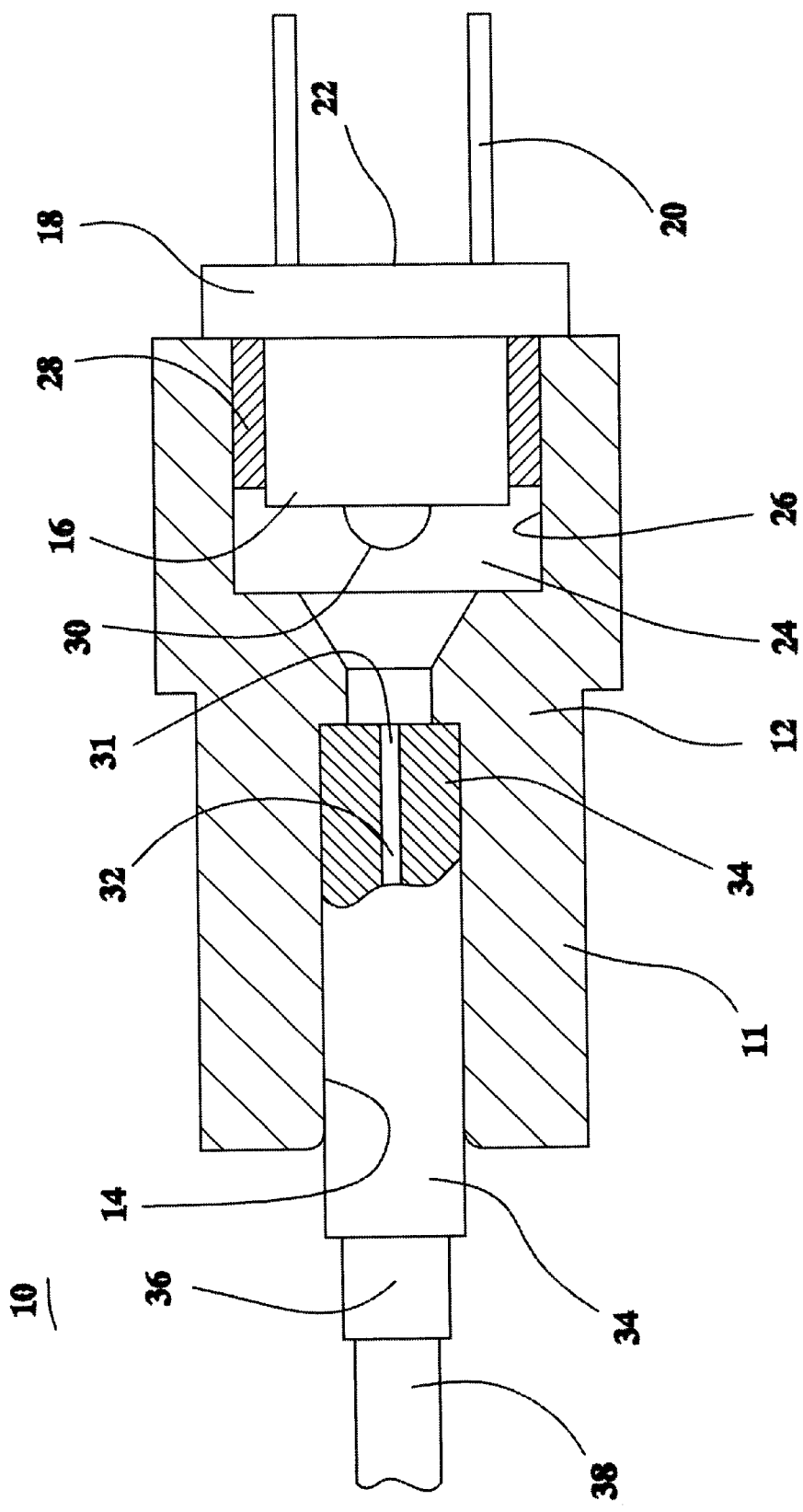
FIG. 1 is a sectional view of an optical ferrule receptacle configured in accordance with the prior art.

A second socket 64 of the cylinder 42 is sized to closely fit around and enclose a semiconductor module, such as a semiconductor laser or and LED as shown in FIG. 1. A passage 76 provides an opening that connects socket 62 with socket 64 in the cylinder 42. The diameter of the passage 76 is smaller than the socket 62, thus creating and stop plate 79. The stop plate 79 functions to accurately position the socket 54 during insertion into the socket 62. Furthermore, the stop plate 79 functions to prevent the socket 54 from twisting and becoming nonparallel to the cylinder 42.

Light waves emitted from a light source module coupled within the socket 64 pass through the passage 76 and into the chamber 70 of socket 54, which is coupled within socket 62. The cylinder 42 can be secured to the socket 54 by using an adhesive or by spot welding. Similarly, a semiconductor module can be secured within the second socket 64 by using an adhesive or by spot welding.

Figure 4:
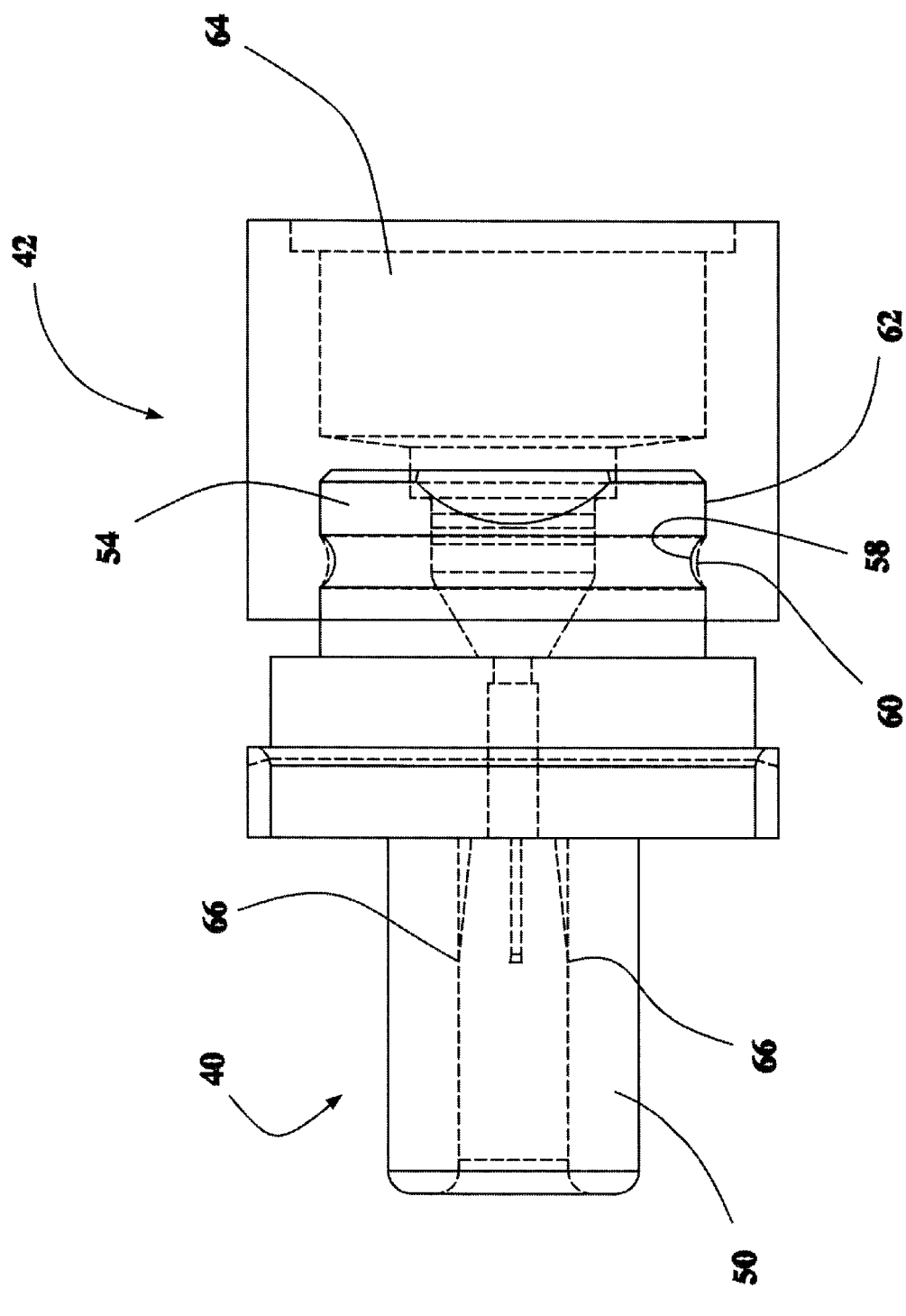
FIG. 4 is an enlarged side view of the optical ferrule receptacle and cylinder shown in FIG. 3, wherein the optical ferrule receptacle and cylinder are coupled together.

FIG. 4 illustrates the optical ferrule receptacle 40 and cylinder 42 of FIG. 3 coupled together. In accordance with present invention, the annular ring 60 of the cylinder 42 is positioned within annular groove 58 of the socket 54 of the optical ferrule receptacle 40. As shown, the socket 54 is correctly positioned within the socket 62 of the cylinder 42. The annular ring 60 securely holds the socket 54 in the correct location. As such, any adhesive or bonding method is unnecessary. If desired, however, the receptacle 40 and the cylinder 42 may be secured together after coupling. Furthermore, the socket 54 is pressed flat against the stop plate to accurately position and correctly align the socket 54 within the socket 62.

FIG. 5 illustrates another embodiment of the present invention. Shown is an optical ferrule receptacle 80 having a ferrule sleeve 82, a base 84, a socket 86, and an annular groove 88. The embodiment shown in FIG. 5 includes two notches 90 in the socket 88. The notches 90 provide a location for the gate 92 wherein molding polymer is injected into a mold for the manufacture of the receptacle 80. In accordance with the present invention, the gate 92 is located at the notch 92, thereby eliminating the necessity to scrape or cut off any excess molding material typically associated with a gate for inputting molding material. By locating the gate 92 at the notch 90, the socket 86 can still be coupled with a closely fitting socket of a corresponding cylinder, without interference from excess molding material surrounding the gate 92.

FIG. 6 is a cross-sectional view of the receptacle 80 shown in and taken along line 6—6 of FIG. 5. FIG. 6 shows a ferrule bore 94 having a consistent diameter 95. In accordance with a second embodiment of the present invention, the approximate last third of the ferrule bore 94 includes three sloped ridges 97. In the preferred embodiment, three ridges 97 are contained within the ferrule bore 96 at equally spaced radial locations, or approximately 120 degrees apart. Other embodiments may use more or less sloped ridges 97. The sloped ridges 97 are preferably part of the same single molded unit of the entire ferrule receptacle 80. The height of the sloped ridges 97 increases, preferably linearly, beginning at the transition point 96 in the ferrule bore 94. The height of a sloped ridge 97 is defined as the distance from the inner surface of the ferrule bore 94 to the top of a sloped ridge 97. The sloped ridges 97 are highest near the base 99. The surface of the sloped ridges that contact an inserted ferrule may be curved or flat.

An optical ferrule is inserted into the ferrule bore 94. Upon reaching the transition point 96, the sloped ridges 97 function to firmly grip the optical ferrule and also accurately position the optical ferrule within the optical bore 94. The sloped ridges 97 also function to prevent an optical ferrule from slipping out of the ferrule bore after the optical ferrule has been inserted. A fully inserted optical ferrule will abut the stop plate 101 located between the aperture 98 and the base 99 of the sloped ridges 97.

An aperture 98 provides a passage between the bore 94 and the chamber 100 of the socket 86. The annular groove 88 is shown on the periphery of the socket 86. The notches 90 are shown having gates 92.

FIG. 7 is an end view of the optical ferrule receptacle shown in and taken along line 7—7 of FIG. 6. FIG. 7 shows a view looking into the open end of the ferrule bore 94 of the ferrule sleeve 82. Illustrated are the sleeve 82 and the three sloped ridges 97. The aperture 98 and the stop plate 101 can also be seen.

Figure 8:
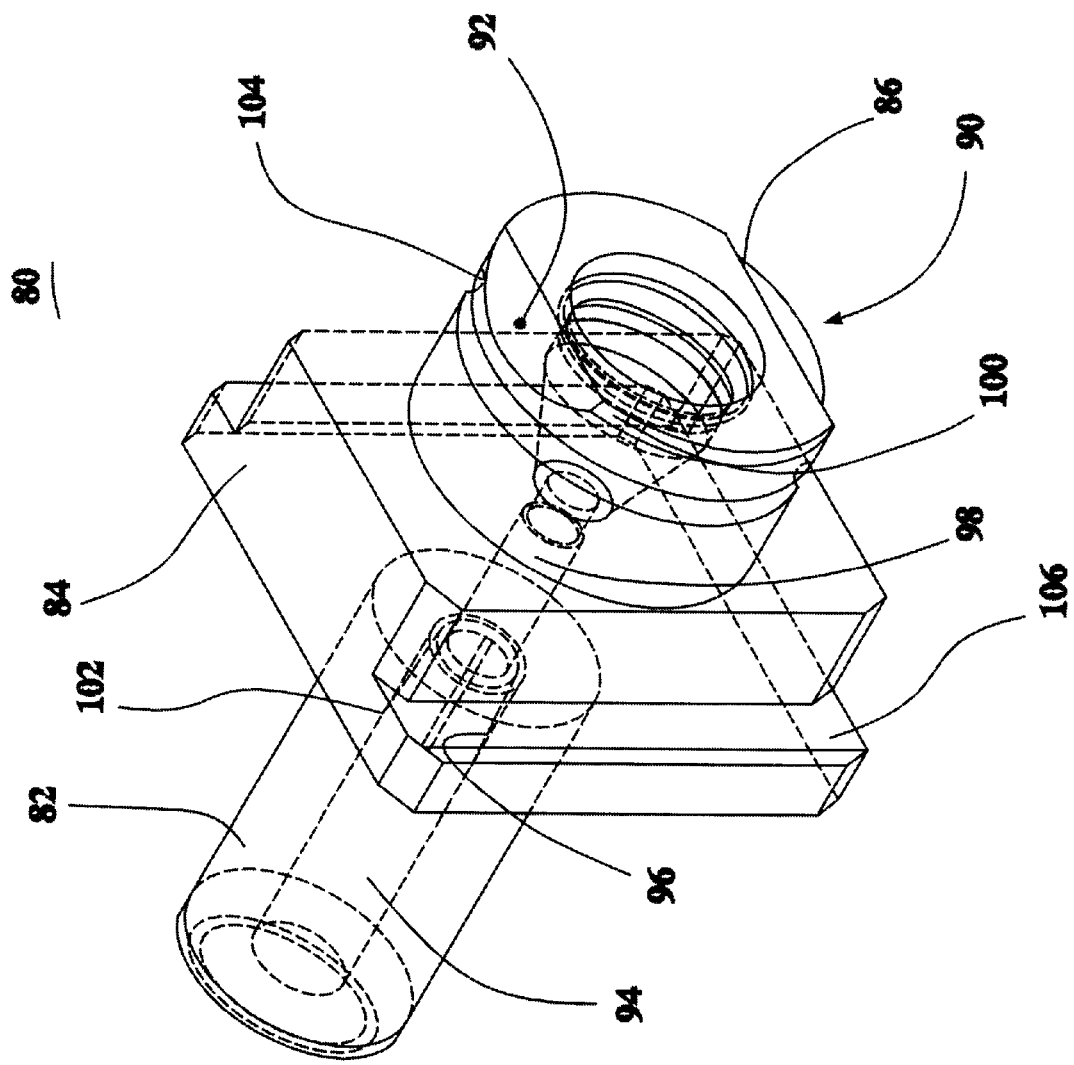
FIG. 8 is a perspective view of the optical ferrule receptacle shown in FIG. 5, wherein the internal configuration is shown in shadow.

FIG. 8 shows an enlarged view of the optical ferrule receptacle 80 shown in FIGS. 5 and 6. The internal construction of the optical ferrule receptacle 80 is shown in shadow. Illustrated are the notches 90 and gates 92 in the socket 86. An aperture 98 connects the chamber 100 of the socket 86 with the bore 94 of the ferrule sleeve 82. The sloped ridges 97 are shown to be located between the transition point 96 and the stop plate 101. Portion 96 of the bore 94 is shown to have a decreasing diameter which begins at transition point 102. Annular groove 104 is located around the periphery of the socket 86. The base 84 includes a flange 106.

The description of the foregoing embodiments and operating parameters has been undertaken for the purposes of illustration. The basic principles of the invention can be embodied in other designs or the same design with modifications operating under the same or different conditions without departing from the scope of the invention.

We claim as our invention:

1. A molded barrel for an optical ferrule, comprising:

a single-molded housing having a base;

a cylinder on a first side of the base having a bore for receiving an optic ferrule;

a socket on a second side of the base, opposing the first side, for receiving an optical element; and a plurality of sloping ridges connected to the bore on the inner wall of the cylinder and adjacent to the base, wherein the height of the sloping ridges increases closer to the base.

2. The molded barrel of claim 1, wherein three sloping ridges are attached to the inner walls of the cylinder.

3. The molded barrel of claim 1, wherein the sloped ridges are spaced equally apart at radial locations.

4. The molded barrel of claim 1, wherein the top surface of the sloped ridges are curved.

5. The molded barrel of claim 1, wherein the top surfaces of the sloped ridges that contact an inserted optical ferrule are flat.

6. The molded barrel of claim 1, wherein an optical ferrule inserted into the cylinder first contacts the sloped ridges at a location approximately two-thirds the total length of the cylinder.

7. The molded barrel of claim 1, including an aperture connecting the bore with the socket.

8. The molded barrel of claim 1, wherein the optical element is a focusing lens.

9. The molded barrel of claim 8, wherein the focusing lens is a ball lens.

10. The molded barrel of claim 1, wherein the socket is circular and includes an annular groove, said molded barrel further comprising:

a cylindrical ring adjacent to the second side of the base and having a first opening encompassing the socket, said cylindrical ring including an annular ridge on the internal wall sized to be received within the annular groove of the socket.

11. The molded barrel of claim 10, wherein a second opening opposite the first opening of the cylindrical ring is sized to receive a semiconductor laser.

12. The molded barrel of claim 1, wherein the molded barrel is a single molded unit.

13. The molded barrel of claim 1, wherein the molded barrel is composed of plastic.

14. The molded barrel of claim 1, wherein the molded barrel is composes of a liquid crystal polymer (LCP).

* * * * *